United States Patent
Caldarone et al.

(10) Patent No.: US 10,384,134 B1
(45) Date of Patent: *Aug. 20, 2019

(54) INCENTIVIZED TASK COMPLETION USING CHANCE-BASED AWARDS

(71) Applicant: KABAM, INC., San Francisco, CA (US)

(72) Inventors: Michael C. Caldarone, Palo Alto, CA (US); Stephanie Schultz, San Francisco, CA (US)

(73) Assignee: Kabam, Inc., San Francisco, CA (US)

(*) Notice: Subject to any disclaimer, the term of this patent is extended or adjusted under 35 U.S.C. 154(b) by 105 days.

This patent is subject to a terminal disclaimer.

(21) Appl. No.: 15/426,910

(22) Filed: Feb. 7, 2017

Related U.S. Application Data

(63) Continuation of application No. 14/331,189, filed on Jul. 14, 2014, now Pat. No. 9,569,931, which is a
(Continued)

(51) Int. Cl.
*A63F 13/00* (2014.01)
*A63F 13/69* (2014.01)
(Continued)

(52) U.S. Cl.
CPC .............. *A63F 13/69* (2014.09); *A63F 13/46* (2014.09); *A63F 13/792* (2014.09)

(58) Field of Classification Search
None
See application file for complete search history.

(56) References Cited

U.S. PATENT DOCUMENTS

| 5,816,918 A | 10/1998 | Kelly |
| 5,933,813 A | 8/1999 | Teicher |

(Continued)

FOREIGN PATENT DOCUMENTS

| KR | 1020130137431 | 12/2013 |
| WO | 2002026333 | 1/2002 |

(Continued)

OTHER PUBLICATIONS

Super Mario Bros. 3 Review, Nintentdo for NES, Feb. 1990, pp. 1-4.*
(Continued)

*Primary Examiner* — Sunit Pandya
(74) *Attorney, Agent, or Firm* — Esplin & Associates, PC

(57) ABSTRACT

A game provided to users of a game space may include a task to be performed by the users. A plurality of virtual chance items may be composed. Individual ones of the virtual chance items may be configured to be activated by the users in the game space to obtain virtual awards in the game space. The virtual awards may include one or more primary awards and one or more secondary awards. Composing the virtual chance items may include determining probabilities that the individual virtual chance items will provide a primary award and/or a secondary award upon activation. The virtual chance items may be distributed to the users that complete the task responsive to these users completing the task. The virtual awards may be provided to the users in accordance with the probabilities assigned to the virtual chance items in response to the users activating the virtual chance items.

16 Claims, 6 Drawing Sheets

Related U.S. Application Data continuation of application No. 13/705,072, filed on Dec. 4, 2012, now Pat. No. 8,790,185.

(51) Int. Cl.
  *A63F 13/792* (2014.01)
  *A63F 13/46* (2014.01)

(56) References Cited

U.S. PATENT DOCUMENTS

| | | |
|---|---|---|
| 5,964,660 A | 10/1999 | James |
| 6,015,344 A | 1/2000 | Kelly |
| 6,142,472 A | 11/2000 | Kliebisch |
| 6,190,225 B1 | 2/2001 | Coleman |
| 6,190,255 B1 | 2/2001 | Thomas |
| 6,347,996 B1 | 2/2002 | Gilmore |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,857,959 B1 | 2/2005 | Nguyen |
| 6,928,474 B2 | 8/2005 | Venkatesan |
| 7,076,453 B2 | 7/2006 | Jammes |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Rails |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,583,266 B2 | 11/2013 | Herbrich |
| 8,636,591 B1 | 1/2014 | Hawk |
| 8,696,428 B1 | 4/2014 | Post |
| 8,715,068 B2 | 5/2014 | Arnone |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,218,714 B2 | 12/2015 | Arnone |
| 9,257,007 B2 | 2/2016 | Santini |
| 9,717,986 B1 | 8/2017 | Kawaguchi |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0151351 A1 | 10/2002 | Baerlocher |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0185932 A1 | 9/2004 | Lombardo |
| 2004/0215524 A1 | 10/2004 | Parkyn |
| 2004/0219969 A1 | 11/2004 | Casey |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1* | 9/2005 | Shimizu .............. A63F 13/10 463/43 |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1* | 12/2006 | Yoshinobu .......... A63F 13/10 463/9 |
| 2006/0287102 A1 | 12/2006 | White |
| 2007/0021213 A1 | 1/2007 | Foe |
| 2007/0060314 A1 | 3/2007 | Baerlocher |
| 2007/0077988 A1 | 4/2007 | Friedman |
| 2007/0111770 A1 | 5/2007 | Van Luchene |
| 2007/0129139 A1 | 6/2007 | Nguyen |
| 2007/0129147 A1 | 6/2007 | Gagner |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |
| 2007/0287523 A1 | 12/2007 | Esses |
| 2008/0009344 A1 | 1/2008 | Graham |

(56) References Cited

U.S. PATENT DOCUMENTS

| | | |
|---|---|---|
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0176625 A1 | 7/2008 | Kelly |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0004048 A1 | 1/2010 | Brito |
| 2010/0022307 A1 | 1/2010 | Steuer |
| 2010/0035689 A1 | 2/2010 | Altshuler |
| 2010/0041472 A1 | 2/2010 | Gagner |
| 2010/0041481 A1 | 2/2010 | Smedley |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256921 A1 | 10/2011 | Pacey |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0034973 A1 | 2/2012 | Frank |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0094743 A1 | 4/2012 | Odom |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1* | 5/2012 | Morrisroe ............... A63F 13/65 463/25 |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1* | 8/2012 | Ganz ..................... G06Q 30/02 705/27.2 |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | vanOs |
| 2012/0322545 A1 | 12/2012 | Arnone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005438 A1 | 1/2013 | Ocko |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013404 A1 | 1/2013 | Suprock |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1* | 4/2013 | Allen ................... G07F 17/3225 463/25 |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |

(56) References Cited

U.S. PATENT DOCUMENTS

| | | |
|---|---|---|
| 2013/0290147 A1 | 10/2013 | Chandra |
| 2013/0303726 A1 | 11/2013 | Mozzarelli |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shone |
| 2014/0315616 A1 | 10/2014 | Avin |
| 2014/0329585 A1 | 11/2014 | Santini |
| 2014/0337259 A1 | 11/2014 | Lamb |
| 2015/0011286 A1 | 1/2015 | Kim |
| 2015/0019349 A1 | 1/2015 | Milley |
| 2015/0031440 A1 | 1/2015 | Desanti |
| 2015/0087378 A1 | 3/2015 | Louie |
| 2015/0306494 A1 | 10/2015 | Pieron |
| 2015/0335995 A1 | 11/2015 | McLellan |
| 2015/0352436 A1 | 12/2015 | Pieron |
| 2019/0143219 A1 | 5/2019 | Kawaguchi |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Elsword, Dec. 27, 2007, KOG Studios, guide posted Mar. 17, 2011 https://web.arch ive.org/web/20110509033123/http ://forums. elswordon l ine.com/Topic5673.aspx,http://en.wikipedia.org/wiki/Elsword (9 pages).

Diablo 2, Blizzard Entertainment, Mar. 23, 2009, manual and on line website http://web.archive.org/web/20090323171356/http://classic.battle.net/diablo2exp/items/basics.shtml (4 pages).

New Feature: Tiered Tournaments and Tournament Updates, printed from http://community.kabam.com/forums/showthread.php?171349-New-Feat on Feb. 11, 2014, 2 pages.

Wikipedia, Mafia Wars, <http://en.wikipedia.org/wiki/Mafia_Wars>, Jan. 28, 2012, 3 pages.

Gem System—Street Fighter X Tekken, http://www.streetfighter.com/us/sfxtic/features/gem-system, printed Nov. 6, 2012, 6 pages.

Profession—WoWWiki—Your guide to the World of Warcraft, URL: http://www.wowwiki.com/Profession, printed Nov. 6, 2012, 8 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Behavioural Analytics & Campaigning", http://lotaris.com/behavioural._analytics_and._Campaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/, 5 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, 1 page.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

Quest item—WoWWiki—Your guide to the World of Warcraft, printed from http://www.wowwiki.com/Quest_Item, Retrieved on Apr. 16, 2014, 1 page.

"Cataclysm Guide: Guild Advancement—Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory—Guides—Equipment Upgrading 101: Potentials, URL: maplestory.nexon.net/guides/game-play/systems/OOFIj/ [Retrieved Jun. 24, 2013], 5 pages.

(56) References Cited

OTHER PUBLICATIONS

Dreamslayer's Enchanting and Upgrading Guide—With pictures:D and Explanations, URL: forums.elswordonline.com/Topic5673.aspx [Retrieved Feb. 21, 2013], 10 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
Elsword—Wikipedia, the free encyclopedia, URL: en.wikipedia.org/wiki/Elsword [Retrieved Feb. 21, 2013], 6 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Super Mario Bros. 3, StrategyWiki, the video game walkthrough and strategy guide, http://strategywiki.org/wiki/Super_Mario_Bros._3, 4 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

MapleStory—Guides—Equipment Upgrading 101: Enhancements, URL: maplestory.nexon.net/guides/game-play/systems/OOFlk; [Retrieved Jun. 24, 2013] 3 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_—_Part_2&oldid=399366>, <http://lotrowiki.com/index.php ?title=Getting_Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_1 &oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.
"Getting Started" written by BoD, published on Oct. 13, 2011 and printed from URL <http://lotrowiki.com/index.php?title=Getting_Started&oldid=349681 >, 5 pages.
"Lotro Store" written by Elinnea, published on Dec. 15, 2011 and printed from URL <http://lotrowiki.com/index.php ?title=LOTRO_Store&oldid=396550>, 23 pages.
"Main Page" written by Starbusty, published on Dec. 12, 2011 and printed from URL <http://lotrowiki.com/index.php?title=Main_Page &oldid=394429>, 2 pages.

* cited by examiner

INCENTIVIZED TASK COMPLETION USING CHANCE-BASED AWARDS

FIELD OF THE DISCLOSURE

This disclosure relates generally to incentivizing task completion, for instance, using chance-based awards and/or other approaches.

BACKGROUND

In typical games, users may be offered a reward or a chance to win an award for performing a specific action to provide users with an incentive to perform the specific action. For example, when the award is of great value, users may be more likely to perform actions to obtain the award. However, providing every user with an award of great value when they perform a specific action may negatively impact other core business metrics associated with the game. To mitigate such issues, some games may offer a chance of winning an award of great value for performing a specific action. Generally, a list of users that have performed the specific action may be provided to an administrator. The administrator may obtain a random subset of those users to declare the subset of users as winners of the award, and then manually provide the award to each of the users of the subset. Among other issues, such a process may be time-consuming, prone to human errors, and/or lacking of consolation prizes to encourage "non-winning" users to continue to perform such chance-based actions.

SUMMARY

One aspect of the disclosure relates to a system configured to facilitate incentivized task completion using chance-based awards, in accordance with one or more implementations. In exemplary implementations, virtual chance items may be distributed to users that complete a task responsive to these users completing the task. Individual ones of the virtual chance items may be configured to be activated by the users in the game space to obtain virtual awards in the game space. The virtual awards may include one or more primary awards and one or more secondary awards. Probabilities that the individual virtual chance items will provide a primary award and/or a secondary award upon activation may be determined to compose the virtual chance items. The virtual awards may be provided to the users in accordance with the probabilities assigned to the virtual chance items in response to the users activating the virtual chance items. Accordingly, users that completed the task may receive a virtual chance item that may, upon activation by the users, provide them with a virtual award even when they do not "win" a primary award (e.g., the virtual chance item may provide them with a secondary award). As compared with typical games, such an approach may, for instance, reduce the amount of users that are discouraged when they do not win, mitigate the level of discouragement when they do not win, increase the incentive to continue completing tasks in a game, and/or other benefits.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate incentivized task completion using chance-based awards. The computer program modules may include one or more of a game module, an item manager module, a completion determination module, an item distribution module, an award administration module, and/or other modules. In some implementations, the client computing platforms may be configured to execute one or more computer program modules that are the same as or similar to the computer program modules of the server(s) to facilitate incentivized task completion using chance-based awards.

The game module may be configured to execute an instance of a game space. The game module may be configured to facilitate presentation of views of the game space to users. The game space may be configured to facilitate interaction of the users with the game space and/or each other by performing operations in the game space in response to commands received from the users. In some implementations, a game may be provided within the game space to users of the game space. The game may include a task to be performed by the users. The users may include a first user.

The item manager module may be configured to compose a plurality of virtual chance items. The virtual chance items include a first virtual chance item. Individual ones of the virtual chance items may be configured to be activated by the users in the game space to obtain virtual awards in the game space. The virtual awards may include one or more primary awards and one or more secondary awards. In certain implementations, the item manager module may be configured such that the virtual chance items may be virtual goods. The virtual goods may be purchasable and/or tradable within the game space. In some implementations, the item manager module may be configured such that the primary awards may be individually greater in value than individual ones of the secondary awards with respect to one or more criteria associated with the game space.

The item manager module may be configured such that composing the virtual chance items may include determining probabilities that the individual virtual chance items will provide a primary award and/or a secondary award upon activation. In certain implementations, composing the virtual chance items may include assigning the determined probabilities to the individual virtual chance items. In some implementations, the probabilities assigned to the virtual chance items may be determined based on an amount of the users that complete the task.

In some implementations, the item manager module may be configured such that, responsive to the amount of the users that complete the task being greater than a threshold amount of the users to be provided with a primary award, the probabilities that the individual virtual chance items will provide a secondary award upon activation may initially be a non-zero value.

The completion determination module may be configured to determine completion of the task by individual ones of the users. In some implementations, the completion determination module may be configured to determine the amount of the users that complete the task.

The item distribution module may be configured to distribute the virtual chance items to the users that complete the task responsive to these users completing the task. For example, responsive to the first user completing the task, the first virtual chance item may be distributed to the first user.

The game module may be configured to provide the virtual awards to the users in accordance with the probabilities assigned to the virtual chance items in response to the users activating the virtual chance items. For example, responsive to the first user activating the first virtual chance item, a first award is provided to the first user in accordance with the probabilities assigned to the first virtual chance item.

In certain implementations, the item manager module may be configured to modify the probabilities assigned to the virtual chance items that have been distributed to users based on the virtual awards provided to other ones of the users through the virtual chance items. For example, the probabilities assigned to the first virtual chance item may be modified after the distribution to the first user responsive to other users activating other ones of the virtual chance items to obtain the virtual awards. In various implementations, the item manager module may be configured such that the probabilities assigned to the first virtual chance item may be modified based on a threshold amount of the users to be provided with a primary award.

In some implementations, the award administration module may be configured to obtain inputs from an administrator to implement one or more of: adding of tasks, the virtual chance items, and/or the virtual awards; modifying of the tasks, the virtual chance items, and/or the virtual awards; or removing of the tasks, the virtual chance items, and/or the virtual awards.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
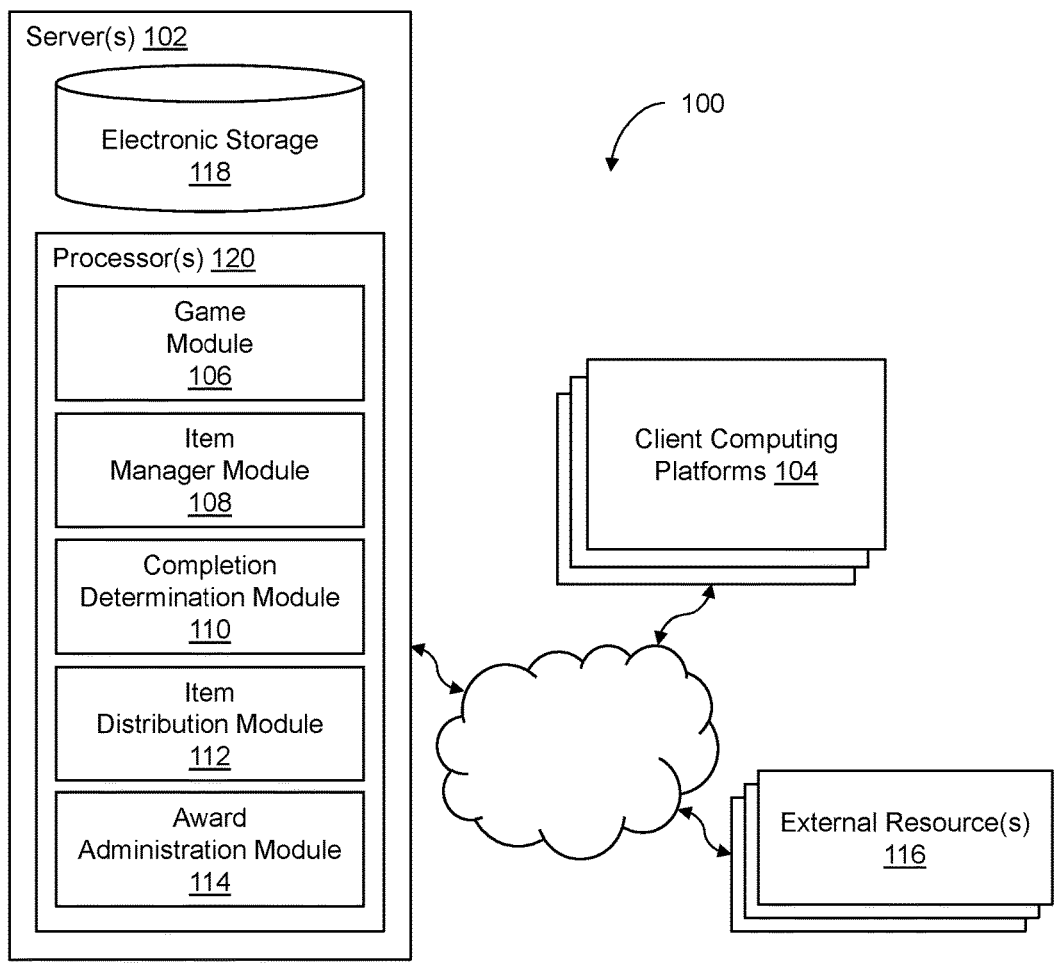
FIG. 1 illustrates a system configured to facilitate incentivized task completion using chance-based awards, in accordance with one or more implementations.

FIG. 1 illustrates a system 100 configured to facilitate incentivized task completion using chance-based awards, in accordance with one or more implementations. In exemplary implementations, virtual chance items may be distributed to users that complete a task responsive to these users completing the task. The task may, for instance, be included in a game provided within a game space to be performed by users of the game space. Completing a task may, for instance, include performing one or more actions and/or refraining from performing one or more actions.

Individual ones of the virtual chance items may be configured to be activated by the users in the game space to obtain virtual awards in the game space. The virtual awards may include one or more primary awards and one or more secondary awards. Probabilities that the individual virtual chance items will provide a primary award and/or a secondary award upon activation may be determined to compose the virtual chance items. The virtual awards may be provided to the users in accordance with the probabilities assigned to the virtual chance items in response to the users activating the virtual chance items. By way of example, responsive to a first user completing the task, a first virtual chance item may be distributed to the first user. Responsive to the first user activating the first virtual chance item, a first award may be provided to the first user in accordance with the probabilities assigned to the first virtual chance item. Accordingly, users that completed the task may receive a virtual chance item that may, upon activation by the users, provide them with a virtual award even when they do not "win" a primary award (e.g., the virtual chance item may provide them with a secondary award). As compared with typical games, such an approach may, for instance, reduce the number of users that are discouraged when they do not win, mitigate the level of discouragement when they do not win, increase the incentive to continue completing tasks in a game, and/or other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate incentivized task completion using chance-based awards. The computer program modules may include one or more of a game module 106, an item manager module 108, a completion determination module 110, an item distribution module 112, an award administration module 114, and/or other modules. In some implementations, client computing platforms 104 may be configured to execute one or more computer program modules that are the same as or similar to the computer program modules of server(s) 102 to facilitate incentivized task completion using chance-based awards.

Game module 106 may be configured to execute an instance of a game space. In some implementations, the game space may be a virtual space. An instance of the game space may be an instance of the virtual space. An instance of the virtual space may be executed by computer modules to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user character being controlled by a user via client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with one another through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

Game module 106 may be configured such that a game may be provided within the game space to users of the game space. The users may include a first user. The game may include a task to be performed by the users. As indicated, completing a task may include performing one or more actions and/or refraining from performing one or more actions. By way of example, tasks may include signing into a game during an event, purchasing and/or trading virtual goods, purchasing and/or trading virtual currency, playing mini-games within a game, building structures, training troops, collecting resources, establishing relationships with other users, attacking the enemy, defending from attacks, refraining from attacking others, competing in a tournament, and/or other tasks with respect to the game space.

Item manager module 108 may be configured to compose a plurality of virtual chance items. The virtual chance items include a first virtual chance item. Individual ones of the virtual chance items may be configured to be activated by the users in the game space to obtain virtual awards in the game space. The virtual awards may include one or more primary awards and one or more secondary awards. In certain implementations, item manager module 108 may be configured such that the virtual chance items may be virtual goods. The virtual goods may be purchasable and/or tradable within the game space.

In some implementations, item manager module 108 may be configured such that the primary awards may be individually greater in value than individual ones of the secondary awards with respect to one or more criteria associated with the game space. For example, the criteria may include an amount of currency needed to purchase a virtual award, an amount of resources needed to obtain a virtual award, a rarity in the game space that is associated with a virtual award, a rating associated with a virtual award, an advantage that a virtual award provides over other virtual awards in the game space, a prestige associated with a virtual award, and/or other criteria. In one use case, each virtual award that is labeled as a primary award with respect to a virtual chance item typically costs a greater amount of virtual currency to purchase than a virtual award that is labeled as a secondary award with respect to the virtual chance item.

By way of example, virtual awards that may be provided through the virtual chance items may include virtual goods, virtual currency, access to an area of the game space (e.g., that is typically difficult to gain access to, that was not previously available to a user, etc.), advancing of research (e.g., to develop skills, to improve technology, to build certain structures, etc.), gaining of character units, training of character units, creation of new relationships, and/or other virtual awards.

Item manager module 108 may be configured such that composing the virtual chance items may include determining probabilities that the individual virtual chance items will provide a primary award and/or a secondary award upon activation. In certain implementations, composing the virtual chance items may include assigning the determined probabilities to the individual virtual chance items. In some implementations, the probabilities assigned to the virtual chance items may be determined based on an amount of the users that complete the task. An amount may, for instance, be a percentage, a number, and/or other indicators of amounts.

Figure 2A:
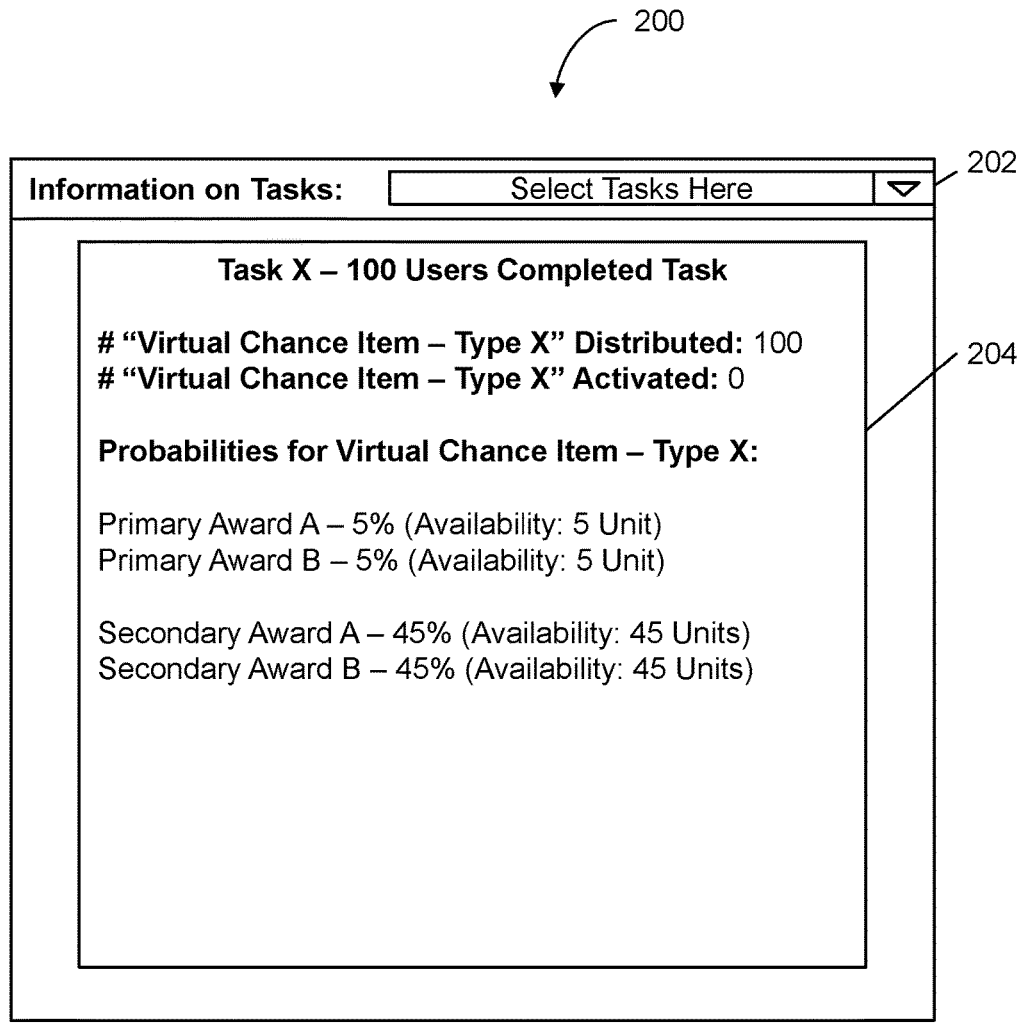
FIGS. 2A and 2B illustrate probabilities that are initially assigned to virtual chance items and the probabilities as modified based on virtual awards provided to users through the virtual chance items, in accordance with one or more implementations.

For example, FIG. 2A illustrates probabilities that are initially assigned to virtual chance items, in accordance with one or more implementations. As shown by FIG. 2A, user interface 200 may provide an administrator or users with information of tasks that have been completed by one or more of the users. An administrator or the users may utilize drop-down menu 202 to select task information that they wish to see. As depicted in window 204, 100 users have completed Task X. In one scenario, 10 primary awards (e.g., 5 units of Primary Award A and 5 units of Primary Award B) may be designated for completion of Task X. As such, in response to an expiring of a threshold time to complete Task X and the 100 users completing Task X, a total of 10 primary awards and 90 secondary awards (e.g., 45 units of Secondary Award A and 45 units of Secondary Award B) may be made available so that each of the 100 users may be provided with a virtual award upon their activation of their virtual chance items. Thus, based on the 100 users completing Task X, a 5% probability may be assigned to Primary Award A, a 5% probability may be assigned to Primary Award B, a 45% probability may be assigned to Secondary Award A, and a 45% probability may be assigned to Secondary Award B.

In some implementations, item manager module 108 may be configured such that, responsive to the amount of the users that complete the task being greater than a threshold amount of the users to be provided with a primary award, the probabilities that the individual virtual chance items will provide a secondary award upon activation may initially be a non-zero value. The threshold amount may, for instance, be a minimum amount, a maximum amount, a particular amount, and/or other threshold amount of users to be provided with a primary award. For example, with respect to FIG. 2A, since 100 users completed Task X, and there are 10 primary awards (e.g., 5 units of Primary Award A and 5 units of Primary Award B) that are available to be provided to the users that completed Task X, there is a 90% probability (e.g., a non-zero value) that a user activating the virtual chance items associated with completing Task X will be provided with a secondary award (e.g., Secondary Awards A or B).

Completion determination module 110 may be configured to determine completion of the task by individual ones of the users. In some implementations, completion determination module 110 may be configured to determine the amount of the users that complete the task. In one use case, completion determination module 110 may track users as they complete the task and keep a record of users that have not completed the task. Completion determination module 110 may, for instance, utilize such tracking and record to determine a percentage and/or a number of users that have completed the task.

Item distribution module 112 may be configured to distribute the virtual chance items to the users that complete the task responsive to these users completing the task. By way of example, responsive to the first user completing the task, the first virtual chance item may be distributed to the first user. For example, referring to FIG. 2A, 100 virtual chance items of Type X have been distributed to the 100 users that have completed Task X. In one scenario, the 100 virtual chance items of Type X may be distributed to the 100 users when a corresponding event associated with Task X has ended. In another scenario, a virtual chance item of Type X may be distributed to a user as the user completes Task X. In yet another scenario, although a virtual chance item of Type X may have been distributed to a user (e.g., immediately after the user completes Task X), the virtual chance item of Type X may be configured to prevent its activation by the user to obtain a virtual award until after the corresponding event has ended.

Returning to FIG. 1, responsive to a virtual chance item being distributed to the first user, the virtual chance item may appear in an inventory associated with the user. This may include adding the virtual chance item to a collection of virtual items available for use to the user within the game space. The virtual chance item may be carried by a character or group of characters under the control of the user, may be stored in a virtual location or building under the control of the user, and/or may be added to the inventory of the user in the game space in other ways. Once the virtual chance item is included in the inventory of the user, the virtual chance item may be used, or activated, by the user at his/her discretion. In some implementations, activation of the virtual chance item may require the user (or a character or group of characters associated with the user) to be in a certain location within the game space, may require use of another virtual item (e.g., as a tool and/or as a combination), may require a health, power, or skill level, and/or may have other requirements.

Game module 106 may be configured to provide the virtual awards to the users in accordance with the probabilities assigned to the virtual chance items in response to the users activating the virtual chance items. By way of example, responsive to the first user activating the first virtual chance item, a first award is provided to the first user in accordance with the probabilities assigned to the first virtual chance item. For example, with respect to FIG. 2A, if one of the 100 users that have been distributed a virtual chance item of Type X activates his/her virtual chance item of Type X, a stochastic selection of the virtual awards may be performed in accordance with the probabilities as shown in window 204, and the stochastically selected virtual award may be provided to the user.

In certain implementations, item manager module 108 may be configured to modify the probabilities assigned to the virtual chance items that have been distributed to users based on the virtual awards provided to other ones of the users through the virtual chance items. By way of example, the probabilities assigned to the first virtual chance item may be modified after the distribution to the first user responsive to other users activating other ones of the virtual chance items to obtain the virtual awards.

Figure 2B:
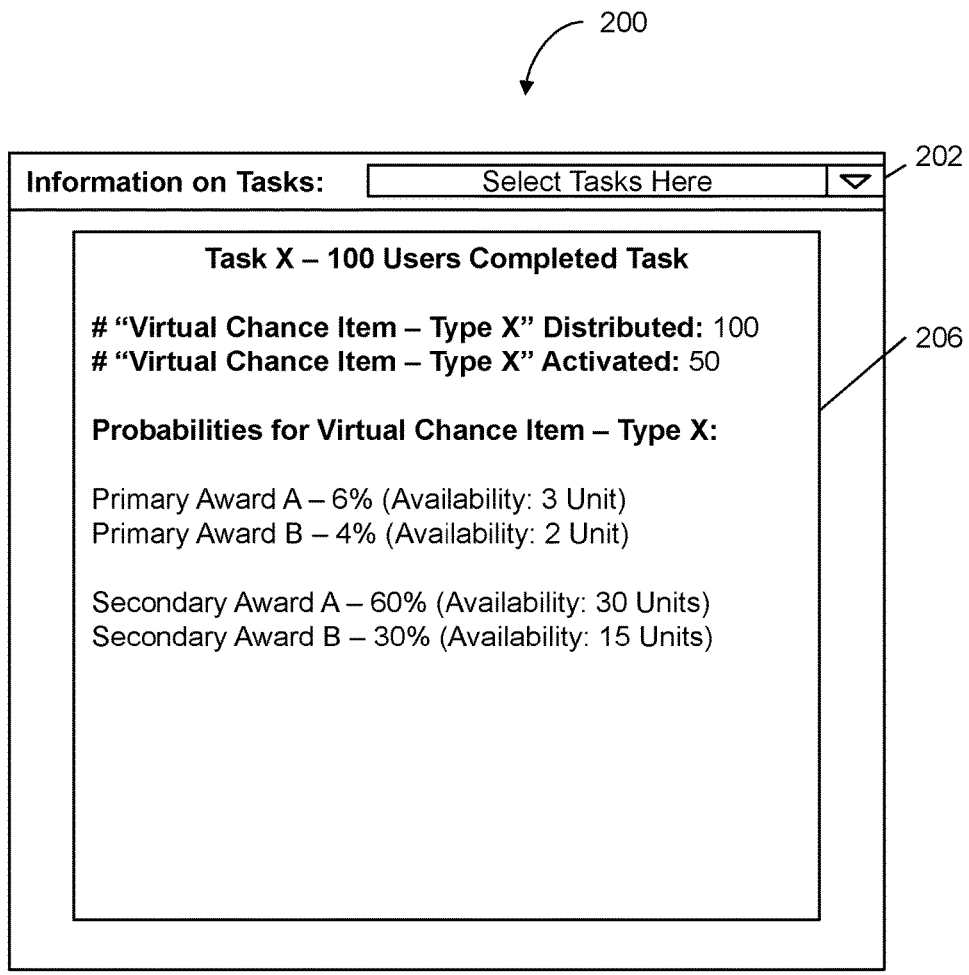

For example, FIG. 2B illustrates probabilities assigned to virtual chance items as modified based on virtual awards provided to users through the virtual chance items, in accordance with one or more implementations. As depicted in updated window 206, 50 of the 100 virtual chance items of Type X that were distributed to the users that completed Task X have been activated. In response to the 50 activations, 2 units of Primary Award A, 3 units of Primary Award B, 15 units of Secondary Award A, and 30 units of Secondary Award B were provided to the users that activated their respective virtual chance items of Type X. As such, 3 units of Primary Award A, 2 units of Primary Award B, 30 units of Secondary Award A, and 15 units of Secondary Award B are left to be provided to the remaining users that have completed Task X. Thus, the probabilities have been modified such that a 6% probability may be assigned to Primary Award A, a 4% probability may be assigned to Primary Award B, a 60% probability may be assigned to Secondary Award A, and a 30% probability may be assigned to Secondary Award B (as compared to the initially assigned probabilities shown in window 204 of FIG. 2A).

Accordingly, as illustrated by updated window 206 of FIG. 2B, the remaining users currently have a 6%, 4%, 60%, and 30% chance of obtaining Primary Award A, Primary Award B, Secondary Award A, and Secondary Award B, respectively, upon activation their virtual chance items of Type X. Such probabilities may, for instance, continue to be modified as one or more of the remaining users are provided their virtual awards upon activation of their virtual chance items of Type X. In some scenarios, presentation of the updated window 206 may be requested by the users of the game space so that they can see what their current probabilities are of getting a desired virtual award before they determine to activate their virtual chance items of Type X.

In various implementations, item manager module 108 may be configured such that the probabilities assigned to the first virtual chance item may be modified based on a threshold amount of the users to be provided with a primary award. For example, referring to FIG. 2B, an event associated with Task X may have been set to give away a maximum of 10 primary awards such that up to 10 users that complete Task X may be provided with a primary award. As such, when 5 of the primary awards had been provided to users (e.g., 2 units of Primary Award A and 3 units of Primary Award B) that already activated their virtual chance items of Type X, the probabilities associated with the primary awards of the virtual chance items of Type X may be modified accordingly in order to meet the maximum threshold amount. It should be noted that, in some implementations, such modifications may be based on a threshold number of the users to be provided with a secondary award.

In some implementations, award administration module 114 may be configured to obtain inputs from an administrator to implement one or more of: adding of tasks, the virtual chance items, and/or the virtual awards; modifying of the tasks, the virtual chance items, and/or the virtual awards; or removing of the tasks, the virtual chance items, and/or the virtual awards. In one use case, award administration module 114 may provide a graphical user interface for obtaining the inputs from the administrator. The graphical user interface may, for instance, be utilized by the administrator to add tasks that are to be associated with virtual chance items and/or awards. The administrator may modify the virtual chance items by adding primary awards and/or secondary awards, by setting the probabilities for the various primary awards and/or secondary awards of the virtual chance items (e.g., such that users are provided a primary award and/or a secondary award upon activation of the virtual chance items in accordance with the probabilities), etc.

Server(s) 102, client computing platforms 104, external resources 116, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 116, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 116, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

In some implementations, server(s) 102 may include an electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. In some implementations, the electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 and/or client computing platforms 104 to function as described herein. It should be noted that, in certain implementations, electronic storage 118 may be a part of server(s) 102, a part of a given client computing platform 104, and/or a separate component of system 100.

In some implementations, processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, and/or other modules. Processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that is the same as or similar to the computer program modules of server(s) 102. Client computing platform 104 may include one or more processors that are the same or similar to processor(s) 120 of server(s) 102 to execute such computer program modules of client computing platform 104.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 3:
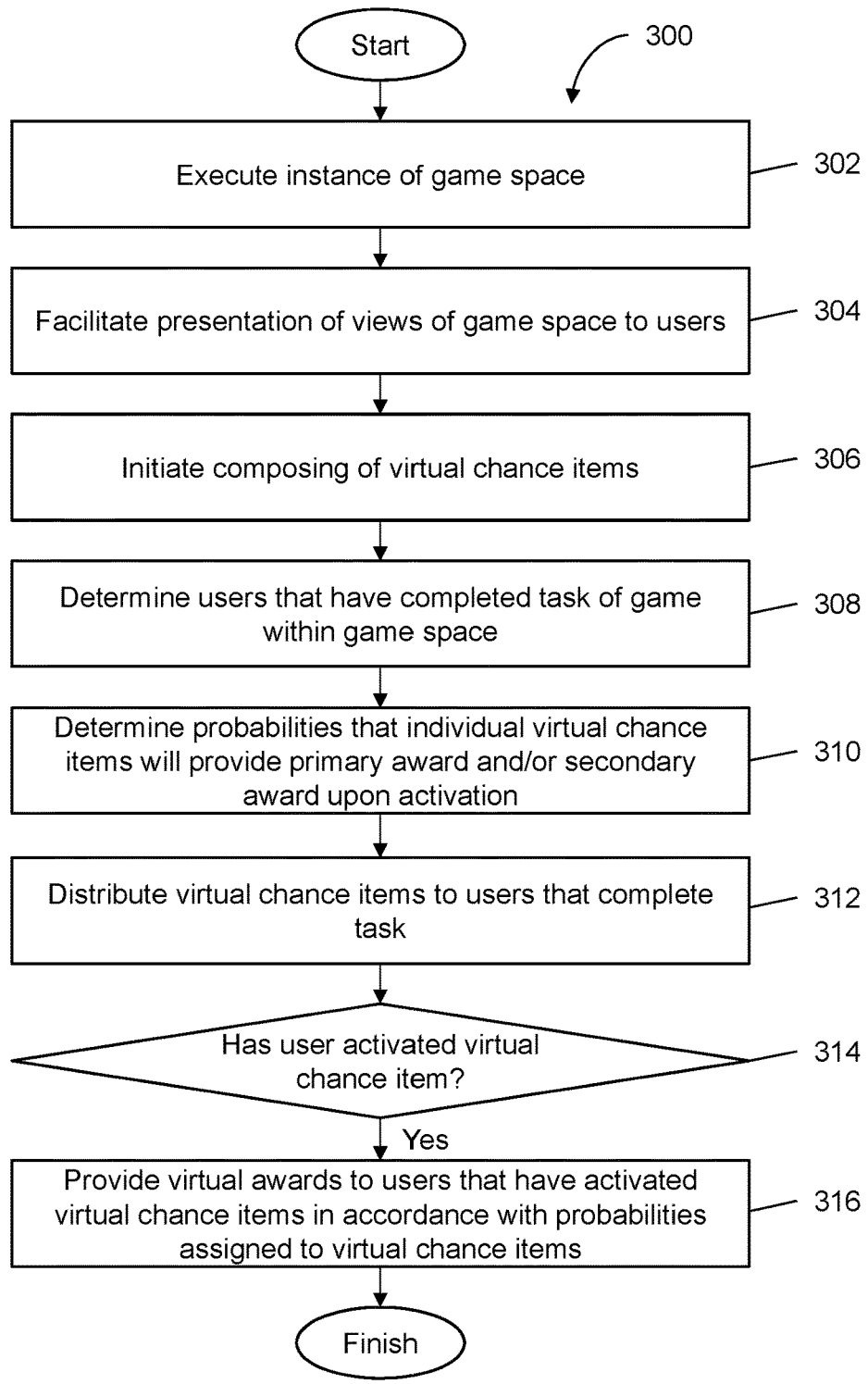
FIG. 3 illustrates a method for facilitating incentivized task completion using chance-based awards, in accordance with one or more implementations.

FIG. 3 illustrates a method for facilitating incentivized task completion using chance-based awards, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a game space may be executed. Operation 302 may be performed by a game module that is the same as or similar to game module 106, in accordance with one or more implementations.

At an operation 304, presentation of views of the game space to users may be facilitated. The game space may be configured to facilitate interaction of the users with the game space and/or each other. For example, the game space may be configured to facilitate the interactions by performing operations in the game space in response to commands received from the users. Operation 304 may be performed by a game module that is the same as or similar to game module 106, in accordance with one or more implementations.

At an operation 306, composing of a plurality of virtual chance items may be initiated. Individual ones of the virtual chance items may be configured to be activated by the users in the game space to obtain virtual awards in the game space. The virtual awards may include one or more primary awards and one or more secondary awards. In some implementations, the virtual chance items may be virtual goods. For example, the virtual chance items may be virtual goods that are purchasable and/or tradable within the game space. In certain implementations, the primary awards may be individually greater in value than individual ones of the secondary awards with respect to one or more criteria associated with the game space. Operation 306 may be performed by an item manager module that is the same as or similar to item manager module 108, in accordance with one or more implementations.

At an operation 308, users that have completed a task may be determined. For example, the task may be included in a game provided within the game space to be performed by the users of the game space. The task may, for instance, be associated with a reward. In some implementation, the task may be presented to users of the game space as being associated with the reward, for instance, to incentivize the users to complete the task. Operation 308 may be performed by a completion determination module that is the same as or similar to completion determination module 110, in accordance with one or more implementations.

At an operation 310, probabilities that the individual virtual chance items will provide a primary award and/or a secondary award upon activation may be determined. In certain implementations, the composing of the virtual chance items may include the determining of the probabilities to be assigned to the virtual chance items. In some implementations, the probabilities assigned to the virtual chance items may be determined based on an amount of the users that complete the task. An amount may, for instance, be a percentage, a number, and/or other indicators of amounts. In various implementations, the probabilities assigned to the virtual chance items may be based on a threshold amount of users to be provided with a primary award. In some implementations, the probabilities assigned to the virtual chance items may be based on a threshold amount of users to be provided with a secondary award. The threshold amount may, for instance, be a minimum amount, a maximum amount, a particular amount, and/or other threshold amount of users to be provided with a primary award and/or secondary award. Operation 310 may be performed by an item manager module that is the same as or similar to item manager module 108, in accordance with one or more implementations.

At an operation 312, the virtual chance items may be distributed to the users that complete the task. As indicated, the virtual chance items may be distributed to the users that complete the task responsive to these users completing the task. For example, the users of the game space may include a first user. The virtual chance items may include a first virtual chance item. Responsive to the first user completing the task, the first virtual chance item may be distributed to the first user. Operation 312 may be performed by an item distribution module that is the same as or similar to item distribution module 112, in accordance with one or more implementations.

At an operation 314, a determination of whether a user has activated a virtual chance item may be effectuated. Operation 314 may be performed by a game module that is the same as or similar to game module 106, in accordance with one or more implementations. Responsive to a determination that a user has activated a virtual chance item, method 300 may proceed to an operation 316.

At operation 316, virtual awards may be provided to the users that have activated the virtual chance items. The virtual awards may be provided to such users in accordance with the probabilities assigned to the virtual chance items. For example, responsive to the first user activating the first virtual chance item, a first award may be provided to the first user in accordance with the probabilities assigned to the first virtual chance item. Operation 316 may be performed by a game module that is the same as or similar to game module 106, in accordance with one or more implementations.

Figure 4:
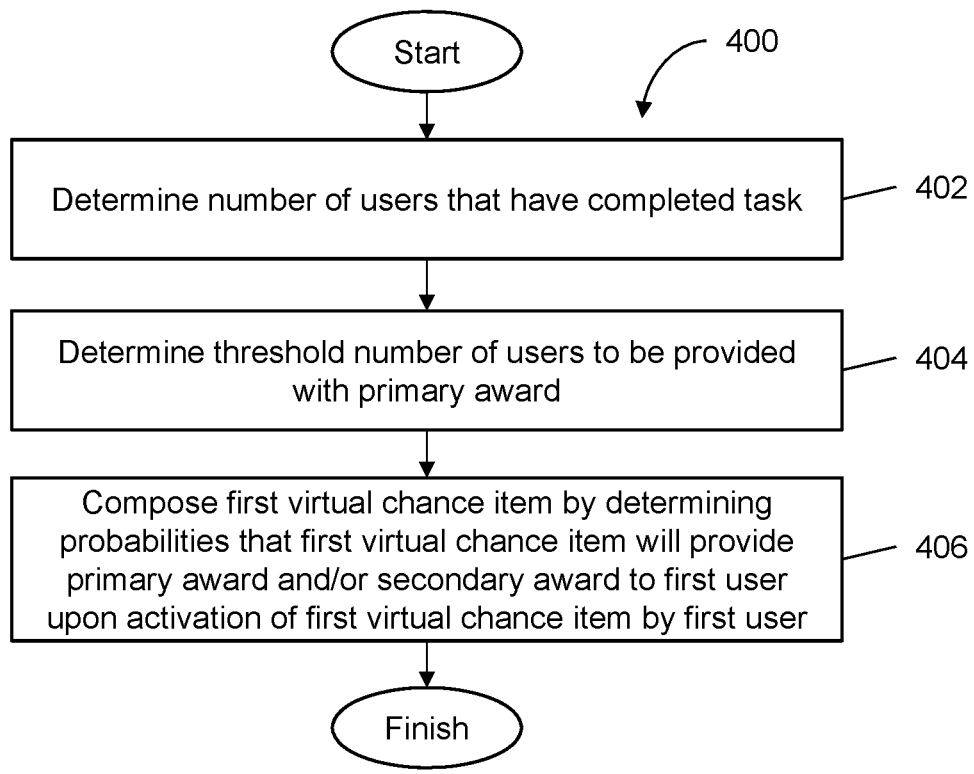
FIG. 4 illustrates a method for determining probabilities associated with virtual awards of a virtual chance item, in accordance with one or more implementations.

FIG. 4 illustrates a method for determining probabilities associated with virtual awards of a virtual chance item, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an amount of users that have completed a task may be determined. The task may be included in a game provided within the game space to be performed by the users of the game space. An amount may, for instance, be a percentage, a number, and/or other indicators of amounts. Operation 402 may be performed by a completion determination module that is the same as or similar to completion determination module 110, in accordance with one or more implementations.

At an operation 404, a threshold amount of users to be provided with a primary award may be determined. In some implementations, a threshold amount of users to be provided with a secondary award may be determined. The threshold amount may, for instance, be a minimum amount, a maximum amount, a particular amount, and/or other threshold amount of users to be provided with a primary award and/or secondary award. Operation 404 may be performed by an item manager module that is the same as or similar to item manager module 108, in accordance with one or more implementations.

At an operation 406, a first virtual chance item may be composed. The first virtual chance item may be composed by determining probabilities that the first virtual chance item will provide a primary award and/or a secondary award to a first user upon activation of the first virtual chance item by the first user. Such probabilities may, for instance, be determined based on the amount of the users that have completed the task, the threshold amount of users to be provided with a primary award, and/or the threshold amount of users to be provided with a secondary award. In some implementations, responsive to the amount of the users that complete the task being greater than a threshold amount of the users to be provided with a primary award, the probabilities that a virtual chance item will provide a secondary award to a user upon activation of the virtual chance item by the user may initially be a non-zero value. Operation 406 may be performed by an item manager module that is the same as or similar to item manager module 108, in accordance with one or more implementations.

Figure 5:
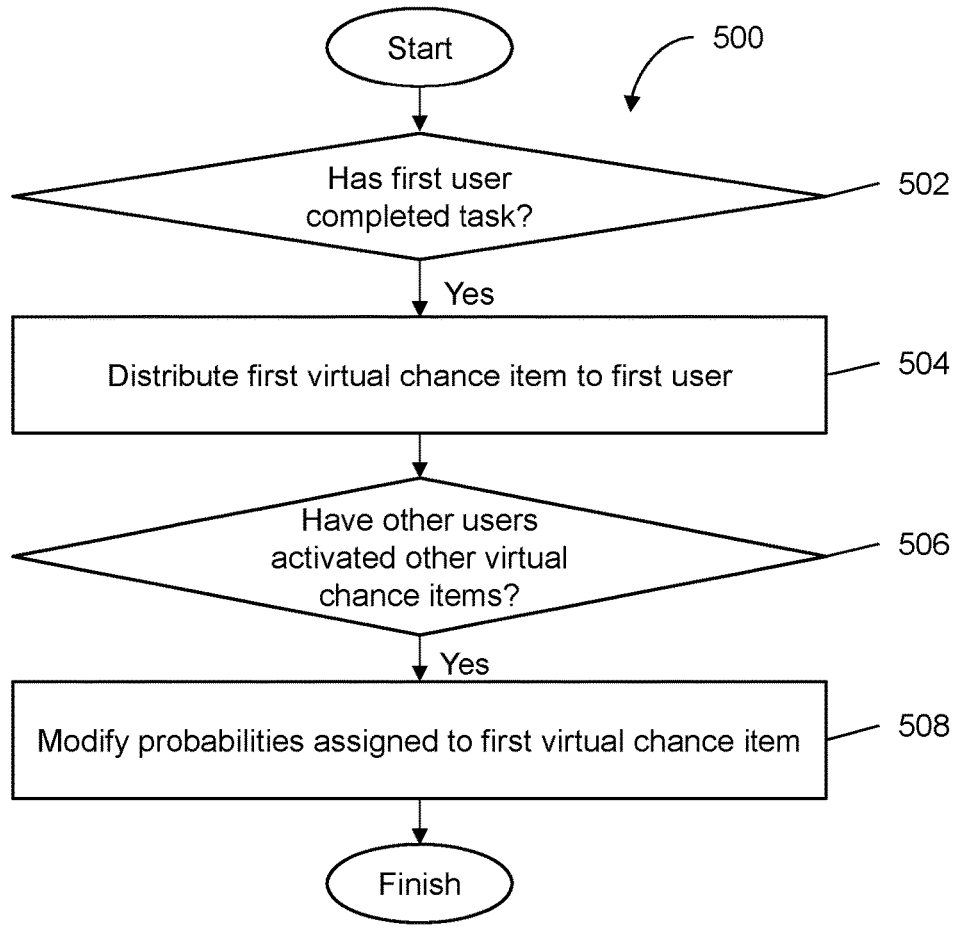
FIG. 5 illustrates a method for modifying probabilities assigned to a virtual chance item, in accordance with one or more implementations.

FIG. 5 illustrates a method for modifying probabilities assigned to a virtual chance item, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a determination of whether a first user has completed a task may be effectuated. Operation 502 may be performed by a completion determination module that is the same as or similar to completion determination module 110, in accordance with one or more implementations. Responsive to a determination that the first user has completed the task, method 500 may proceed to an operation 504.

At operation 504, a first virtual chance item may be distributed to the first user. The first virtual chance item may, for instance, be assigned probabilities that the first virtual chance item will provide a primary award and/or a secondary award upon activation of the first virtual chance item by the first user. Operation 504 may be performed by an item distribution module that is the same as or similar to item distribution module 112, in accordance with one or more implementations.

At an operation 506, a determination of whether other users have activated other virtual chance items may be effectuated. The other virtual chance items may, for instance, be a part of the virtual chance items that are provided to the users that complete the task responsive to these users completing the task. Operation 506 may be performed by a game module that is the same as or similar to game module 106, in accordance with one or more implementations. Responsive to a determination that other users have activated other virtual chance items, method 500 may proceed to an operation 508.

At operation 508, the probabilities assigned to the first virtual chance item may be modified. For example, the probabilities assigned to the first virtual chance item may be modified after the distribution responsive to other users activating other ones of the virtual chance items to obtain the virtual awards. In various implementations, the probabilities assigned to the first virtual chance item may be modified based on a threshold amount of users to be provided with a primary award. In some implementations, the probabilities assigned to the first virtual chance item may be modified based on a threshold amount of users to be provided with a secondary award. Operation 508 may be performed by an item manager module that is the same as or similar to item manager module 108, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating incentivized action performance using chance-based awards, the system comprising:
one or more processors configured by machine-readable instructions to:
execute an instance of a game space, and to facilitate presentation of views of the game space to users, wherein the users include a first user;
determine performance of a prescribed action by individual ones of the users;
distribute virtual chance items to inventories of virtual items usable in the online game associated with the individual ones of the users that perform the prescribed action responsive to these users performing the prescribed action such that, responsive to the first user performing the prescribed action, the first virtual chance item is distributed to a first inventory of virtual items usable in the online game by the first user, wherein individual ones of the virtual chance items are configured to be activated by the users in the game space to obtain virtual awards in the game space, and
wherein the virtual awards are provided to the users in accordance with probabilities assigned to the virtual chance items in response to the users activating the virtual chance items such that, responsive to the first user selecting the first virtual chance item from among the virtual items in the first inventory to initiate activation of the first virtual chance item, a first award is determined for the first user in accordance with the probabilities assigned to the first virtual chance item and provided to the first user in accordance with the probabilities assigned to the first virtual chance item.

2. The system of claim 1, wherein the probabilities assigned to the virtual chance items are determined based on an amount of the users the perform the prescribed action.

3. The system of claim 1, wherein the one or more processors are configured by machine-readable instructions to modify the probabilities assigned to the virtual chance items that have been distributed to users based on the virtual awards provided to other ones of the users through the virtual chance items such that the probabilities assigned to the first virtual chance item are modified after the distribution to the first user responsive to other users activating other ones of the virtual chance items to obtain the virtual awards.

4. The system of claim 3, wherein the one or more processors are configured by machine-readable instructions such that the probabilities assigned to the first virtual chance item are modified based on a threshold amount of the users to be provided with a primary award.

5. The system of claim 1, wherein the one or more processors are configured by machine-readable instructions such that, responsive to the amount of the users that perform the prescribed action being greater than a threshold amount of the users to be provided with a primary award, the probabilities that the individual virtual chance items will provide a secondary award upon activation are initially a non-zero value.

6. The system of claim 5, wherein the primary award is greater in value than the secondary award with respect to one or more criteria associated with the game space.

7. The system of claim 1, wherein the virtual chance items are virtual goods that are purchasable and/or tradable within the game space.

8. The system of claim 1, where in the one or more processors are configured by machine-readable instructions to obtain inputs from an administrator to implement one or more of: adding of prescribed actions, the virtual chance items, and/or the virtual awards; modifying of the prescribed actions, the virtual chance items, and/or the virtual awards; or removing of the prescribed actions, the virtual chance items, and/or virtual awards.

9. A method for facilitating incentivized action performance using chance-based awards, the method being implemented in a computer system that includes one or more processors configured by machine-readable instructions, the method comprising:
executing an instance of a game space;
facilitating presentation of views of the game space to users, wherein the users include a first user;
determining performance of a prescribed action by individual ones of the users;
distributing virtual chance items to inventories of virtual items usable in the online game associated with the individual ones of the users that perform the prescribed action responsive to these users performing the prescribed action such that, responsive to the first user performing the prescribed action, the first virtual chance item is distributed to a first inventory of virtual items usable in the online game by the first user, wherein individual ones of the virtual chance items are configured to be activated by the users in the game space to obtain virtual awards in the game space; and
providing the virtual awards to the users in accordance with probabilities assigned to the virtual chance items in response to the users activating the virtual chance items such that, responsive to the first user selecting the first virtual chance item from among the virtual items in the first inventory to initiate activation of the first virtual chance item, a first award is determined for the first user in accordance with the probabilities assigned to the first virtual chance item and provided to the first user in accordance with the probabilities assigned to the first virtual chance item.

10. The method of claim 9, wherein the probabilities assigned to the virtual chance items are determined based on an amount of the users that perform the prescribed action.

11. The method of claim 9, comprising modifying the probabilities assigned to the virtual chance items that have been distributed to users based on the virtual awards provided to other ones of the users through the virtual chance items such that the probabilities assigned to the first virtual chance item are modified after the distribution to the first user responsive to other users activating other ones of the virtual chance items to obtain the virtual awards.

12. The method of claim 11, where in the probabilities assigned to the first virtual chance item are modified based on a threshold amount of the users to be provided with a primary award.

13. The method of claim 9, wherein, responsive to the amount of the users that perform the prescribed action being greater than a threshold amount of the users to be provided with a primary award, the probabilities that the individual virtual chance items will provide a secondary award upon activation are initially a non-zero value.

14. The method of claim 13, wherein the primary award is greater in value than the secondary award with respect to one or more criteria associated with the game space.

15. The method of claim 9, wherein the virtual chance items are virtual goods that are purchased and/or tradable within the game space.

16. The method of claim 9, comprising receiving inputs from an administrator to implement one or more of: adding of prescribed actions, the virtual chance items, and/or virtual awards; modifying of the prescribed actions, the virtual chance items, and/or virtual awards; or removing of the prescribed actions, the virtual chance items, and/or virtual awards.

\* \* \* \* \*